United States Patent
Dave et al.

(10) Patent No.: US 9,554,050 B2
(45) Date of Patent: Jan. 24, 2017

(54) MOBILE DEVICE USING IMAGES AND LOCATION FOR REMINDERS

(71) Applicant: Apple Inc., Cupertino, CA (US)

(72) Inventors: Swapnil R. Dave, Santa Clara, CA (US); Kaustubh M. Rao, Santa Clara, CA (US)

(73) Assignee: APPLE INC., Cupertino, CA (US)

( * ) Notice: Subject to any disclaimer, the term of this patent is extended or adjusted under 35 U.S.C. 154(b) by 406 days.

(21) Appl. No.: 13/784,695

(22) Filed: Mar. 4, 2013

(65) Prior Publication Data

US 2014/0247383 A1    Sep. 4, 2014

(51) Int. Cl.
H04N 5/232    (2006.01)

(52) U.S. Cl.
CPC ...... *H04N 5/23293* (2013.01); *H04N 5/23222* (2013.01)

(58) Field of Classification Search
CPC ...... H04N 21/6175; H04N 5/77; H04N 7/181; H04N 1/00307; H04N 1/00413; H04N 1/32128; H04N 2201/3253; H04N 1/00204; H04N 1/00206; H04N 1/00244; H04N 1/4115; H04N 2201/3274; H04N 5/23293
USPC .... 348/211.3, 231.6, 333.02, 333.11, 333.12
See application file for complete search history.

(56) References Cited

U.S. PATENT DOCUMENTS

| | | | |
|---|---|---|---|
| 6,259,381 B1 * | 7/2001 | Small | F42C 13/00 340/988 |
| 7,109,848 B2 * | 9/2006 | Schybergson | 340/309.7 |
| 7,493,211 B2 | 2/2009 | Breen | |
| 7,583,972 B2 * | 9/2009 | Clipsham | G08B 1/08 455/418 |
| 8,054,180 B1 * | 11/2011 | Scofield et al. | 340/539.13 |
| 2006/0077055 A1 * | 4/2006 | Basir | G06Q 10/109 340/539.13 |
| 2006/0241862 A1 | 10/2006 | Ichihara et al. | |
| 2008/0075243 A1 * | 3/2008 | Kent et al. | 379/88.12 |

(Continued)

FOREIGN PATENT DOCUMENTS

WO    WO 2014065808 A1 *    5/2014    ........ H04M 1/72552

OTHER PUBLICATIONS

Office Action, dated Jan. 5, 2015, received in U.S. Appl. No. 13/784,645, 11 pages.

(Continued)

*Primary Examiner* — Twyler Haskins
*Assistant Examiner* — Padma Haliyur
(74) *Attorney, Agent, or Firm* — Morgan, Lewis & Bockius LLP (57) ABSTRACT

Images can be used to improve setting reminders and the usefulness of reminders. For example, a mobile device can enable the user to request a reminder that uses one or more images obtained from a camera of the mobile device. The user can set a time period for when the image-based reminder is provided to the user. The image can provide information about the reminder as well as a visual depiction of the location the reminder is intended. A location can be detected in conjunction with capturing an image, and the location can be used to form a reminder message. The image can also be analyzed to provide the content of a message (e.g., text can be identified in the image and inserted into the message or used to access a database of corresponding messages). The derived message and/or the image can be provided for the reminder.

20 Claims, 8 Drawing Sheets

(56) References Cited

U.S. PATENT DOCUMENTS

| | | |
|---|---|---|
| 2009/0076725 A1 | 3/2009 | Bhogal et al. |
| 2009/0222482 A1 | 9/2009 | Klassen et al. |
| 2010/0017118 A1 | 1/2010 | Dougherty |
| 2010/0093371 A1* | 4/2010 | Gehrke .................. H04W 4/02 455/456.2 |
| 2010/0214428 A1* | 8/2010 | Wood .................. H04N 1/0035 348/222.1 |
| 2010/0295676 A1* | 11/2010 | Khachaturov et al. ....... 340/540 |
| 2011/0066366 A1 | 3/2011 | Ellanti et al. |
| 2011/0070872 A1 | 3/2011 | Ellanti et al. |
| 2013/0120595 A1* | 5/2013 | Roach et al. ............. 348/207.1 |
| 2014/0162692 A1 | 6/2014 | Li et al. |
| 2014/0248910 A1 | 9/2014 | Dave et al. |

OTHER PUBLICATIONS

Notice of Allowance, dated Aug. 14, 2015, received in U.S. Appl. No. 13/784,645, 8 pages.
Office Action, dated May 19, 2016, received in U.S. Appl. No. 14/970,501, 10 pages.

* cited by examiner

Device 600

| Keyword | Message |
|---|---|
| 602 "Oil Change" | 612 "Take your car to get the Oil changed" |
| "Dry Cleaners" | "Pick up clothes at the dry cleaners" |
| "State Park" | "You have not visited the state park in a while" |

Database Table 620

*FIG. 6A*

Device 650

| Location | Message/Keyword |
|---|---|
| Location #1 | "Oil Change" |
| 682 Location #2 | 684 "Pick up clothes at the dry cleaners" |
| 680 Location #3 | "State Park" / "Golf Course" |

Database Table 670

MOBILE DEVICE USING IMAGES AND LOCATION FOR REMINDERS

BACKGROUND

People can set a reminder for a particular date and time. For example, a person might set an appointment into a calendar for a particular data and time. Most reminders are to perform tasks that are not related to a location. But, some reminders may be associated with a location. For example, a user typically would a meeting room number into the calendar. However, such manual entry by a user can be time consuming, particularly if one is using a mobile device, which often has a smaller form factor than a desktop computer.

Additionally, the information contained in an alert sent to the user is only as good as the information entered by the user. If the user has not entered a location for a reminder about a task (e.g., to purchase an item or service), the user may have to spend time to determine a location for fulfilling the task or even spend time remembering exactly what the task was.

Therefore, it is desirable to provide methods and devices to more easily set reminders on a mobile device and to make the reminders more useful.

DETAILED DESCRIPTION

A person may want to set a reminder to get an oil change for his/her car. To accomplish this, a user might enter an appointment into a calendar for a particular time/date, and enter the text "get oil changed" as the message to be displayed when the date/time is reached. But, once the user gets such a reminder, the user has to select a place to get an oil change, which might involve remembering where the user got the last oil change. Also, it is typical that a user would think of setting such a reminder when the only computer available is a mobile phone (or other relatively small mobile device), thereby forcing the user to perform many input commands.

Embodiments can use images to improve setting reminders and the usefulness of reminders. For example, a mobile device can provide an option for the user to request a reminder that uses one or more images obtained from a camera. The user can then provide a time period for the reminder, and the image can be provided to the user when the time period is reached. The image can provide information about the reminder as well as a visual depiction, which can cause the user to remember the location. The image can also be analyzed to provide the content of a message (e.g., text can be identified in the image and then inserted into the message). The message can be provided instead of or in addition to providing the image. Additionally, a location can be detected in conjunction with capturing the one or more images, and the location can be used to form a reminder message.

In one embodiment, after the user requests an image-based reminder in conjunction with capturing an image (e.g., a photo or a video), a location can be detected corresponding to the location of the one or more images. Thus, when the reminder goes off, the location and image can both be provided to the user. The location could be provided on a map or a photo provided to remind the user of the location. Furthermore, the user does not have to enter the location, but the mobile phone (or a server connected to the phone) can automatically determine the current location of the phone when the reminder is set. Thus, someone can set a location-based reminder by simply stating "remind me to come back here in two months," where the image can convey the purpose of the task. The time period could be specific as an interval (e.g., 3 months) or using a specific date (e.g., January 15). The location can also be used to identify a type of store at the location (e.g., using keywords), and pre-made messages can be set for the reminder, thereby allowing the user to simply take a photo (with an associated location obtained), and not have to enter a message.

As an example, a user could take an image (e.g., a picture) of an oil change store, which implicates GPS to obtain a location of the mobile device. The user can then select an option to set a reminder for the location of the captured image and enter a time. When the time is reached, the image and/or a map location of the oil change store can be displayed on the mobile device. A user could also just say "remind me to come back here in two months," and the device would use GPS (or other method) to obtain the location and store the reminder with the time setting. A database could be accessed to determine that the location is associated with an oil change place, and an automatic message can be set indicating that the oil needs to be changed when the time period is reached.

I. Image-Based Reminder

Figure 1A:
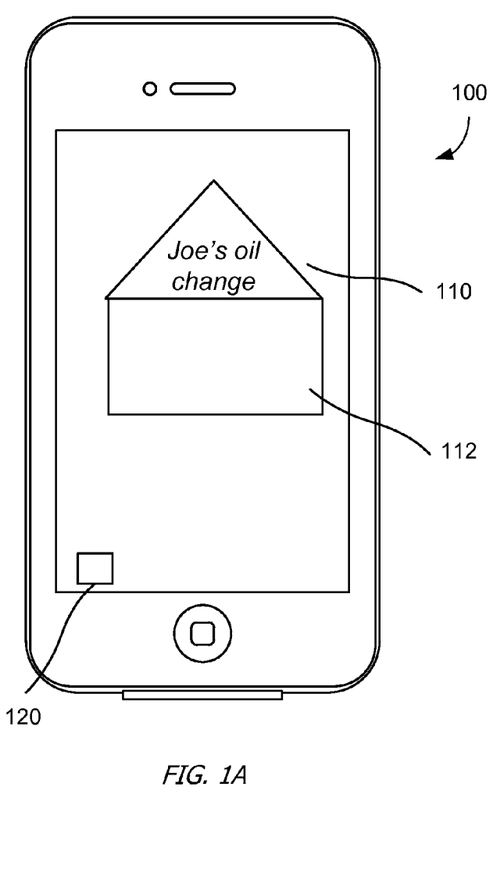
FIG. 1A show a mobile device with a user interface to create an image-based reminder according to embodiments of the present invention.

FIG. 1A show a mobile device 100 with a user interface to create an image-based reminder according to embodiments of the present invention. Mobile device 100 shows an image 110, e.g., from a photograph or a video. More than one image may be shown, e.g., in a tiled display. Image 100 may be displayed just after image 110 was captured using a camera of mobile phone 100. In another implementation, image 110 may be displayed in response to a user selecting image 110 from a set of images, e.g., by browsing the set of images and selecting the desired image(s). Mobile device 100 can have a camera function to capture image 110, e.g., as a photo or a video.

As shown, image 110 is of a building 112 that has the text "Joe's Oil Change" near the top of the building. A user might take this photo after an oil change for the user's car and want to set a reminder for the next oil change. Image 110 can server as a useful reminder about what the reminder is for. For example, as image 110 includes the phrase "oil change", the user would typically recognize that the reminder pertains to an oil change for the user's case. Additionally, the photograph would likely include a car and/or a garage door (or opening that the garage door closes) leading into a work area. Image 110 can also provide a reminder as to what service station was used for the last oil change. The user might also be familiar enough with the service station to know where the service station is located.

As part of displaying image 110, a user input object 120 (e.g., a button, icon, or link) can be displayed to allow a user to indicate that image 110 is to be used to create an image-based reminder. User input object 120 can have a graphical shape to indicate an image-based reminder function is associated with the user input object 120. As another example, user input object 120 could include text to indicate an association with the image-based reminder function. In another implementation, user input object 120 can also be a voice-activated object. Instead of displaying an option on a screen with the image, other embodiments can display a prompt on a screen by itself or with other options from the camera. For example, the prompt might ask "Do you want to add your photo to a reminder?".

Figure 1B:
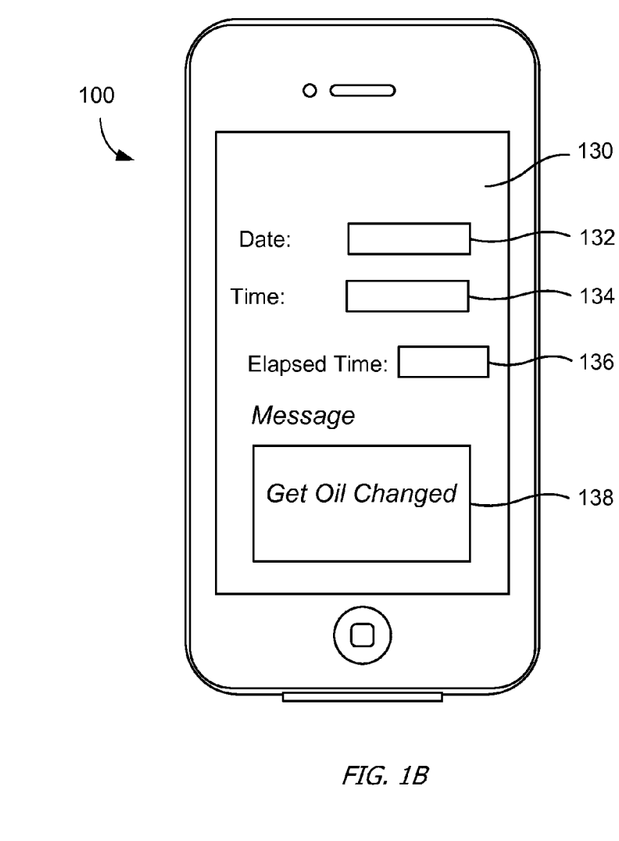
FIG. 1B shows mobile device displaying a screen for entering a time period for the image-based reminder according to embodiments of the present invention.

FIG. 1B shows mobile device 100 displaying a screen 130 for entering a time period for the image-based reminder according to embodiments of the present invention. In one embodiment, screen 130 can be displayed after the user selects user input object 120 for creating an image-based reminder. Screen 130 allows a user to specify information for the image-based reminder, such as a time period for the reminder and a message to be provided for the reminder. In an example of FIG. 1A where the image is a photo of an oil change service station, the user may want to set the time period to the time prescribed by the oil change worker.

In various embodiments, boxes 132-136 can be used to enter the time period. As shown, the time can be entered as a date, time, or an elapsed time. In one implementation, only the date is sufficient to specify the time period, where a default time can be used (e.g., midnight or 9:00 AM of the date selected). The date can be selected from a calendar or as a day of the week, or through any other suitable mechanism.

In another implementation, only the time is sufficient to specify the time period, with a default date of today or tomorrow, or whenever that time is next reached. In yet another implementation, an elapsed time can be entered. The elapsed time can be measured from a start time of receiving the initial user request, capturing the images, or completion of the user request, or even from some other user specified time. The elapsed time can be in any units, such as minutes, hours, days, etc.

Boxes 132-136 could be displayed at the same time, or options can be selected for determining which boxes to display (e.g., just one of boxes 132-136 or two of them). For example, an option for date/time or elapsed time can be chosen, with boxes 132 and 134 being displayed when the date/time option is selected, and box 136 displayed when the elapsed time option is selected. One implementation can provide can provide any combination of the fields in boxes 132-136 or other user interface to enter the time period. Such fields can be input by using a keyboard from a touch screen, entered by voice, using a scroll wheel that can be moved to the desired time, etc.

In one embodiment, a user can specify a message to be displayed for the reminder. For example, a box 138 can be provided for providing a message. As shown, the user has entered "Get Oil Changed," which may correspond to the example in FIG. 1A. When the time period is reached, the image and a message (if specified) can be provided to the user as part of a reminder.

Figure 1C:
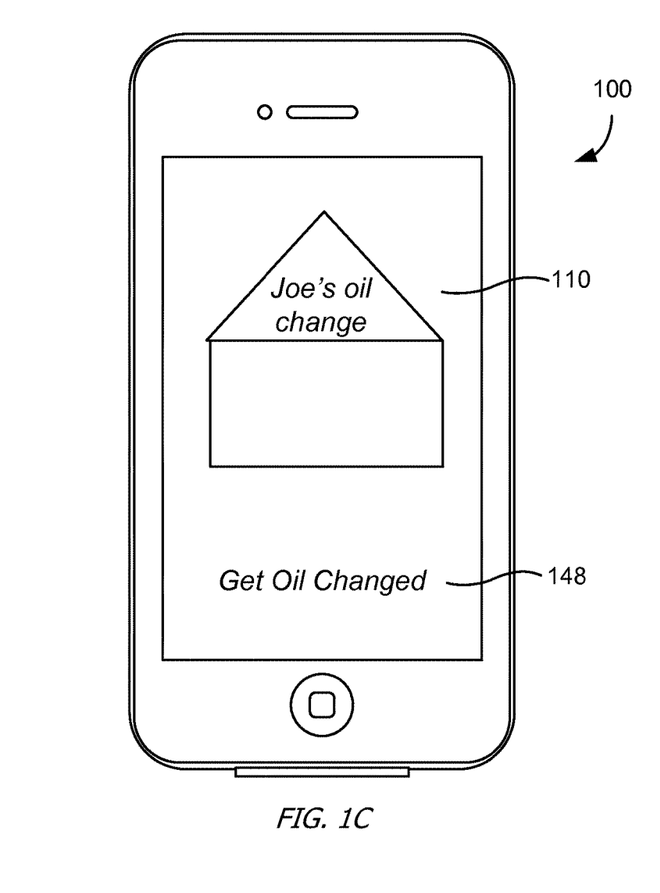
FIG. 1C shows mobile device displaying image with a message when the time period is reached according to embodiments of the present invention.

FIG. 1C shows mobile device 100 displaying image 110 with a message 148 when the time period is reached according to embodiments of the present invention. In this manner, message 148 can be provided to the user to provide a quick and clear notification of a task associated with the reminder. The image 110 can be provided to serve as a reminder of which oil change place the user went last, and perhaps indicate where to go, as the user may remember where the vendor is located from the image. In some embodiments, the image could be of any object, and not just of a particular place, such as a store or establishment. In other embodiments, only image 110 or only message 138 is displayed.

In the example of FIG. 1A, the user request was received after image 110 was already taken. However, in other embodiments, the user request can be received before image 110 is taken. As with a user request being received after the image is captured, a user request before the capturing of the image can be received through various mechanisms, e.g., voice, text from a keyboard, selecting an icon or button, etc. In such an embodiment, a camera function can be activated as one step of an image-based reminder function that is initiated in response to the user request.

Figure 1D:
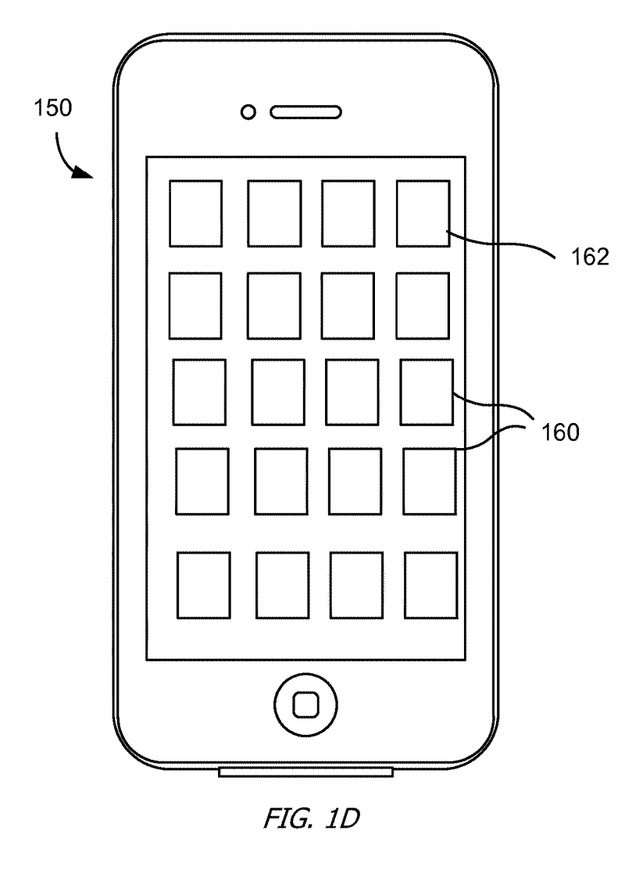
FIG. 1D shows a mobile device 150 displaying icons for applications ("apps") 160 where one app 162 is an image-based reminder app according to embodiments of the present invention.

FIG. 1D shows a mobile device 150 displaying icons for applications ("apps") 160 where one app 162 is an image-based reminder app according to embodiments of the present invention. In one embodiment, the selection of app 162 can act as a user request to create an image-based reminder. Once selected, app 162 can provide a screen to enter information (e.g., as in screen 130) and provide a camera function to capture images, where such screens can occur in any order.

For example, in response to the selection of app 162, app 162 can open to a camera function, which can use a camera of mobile device 150. Since the camera was opened via app 162, mobile device 162 can automatically create an image-based reminder using an image subsequently captured with camera. In another implementation, before going to the camera function, the screen 130 of FIG. 1B can be displayed to provide information for the image-based reminder. Once the information has been provided, app 162 can automatically go to the camera, or move to the camera in response to a user request selected from within app 162. In one implementation, the selection of app 162 can act as the user request, or a later screen can provide a mechanism for the user to confirm or provide a user request to create the image-based reminder.

Regardless, or the order of the user request and the capturing of the image, the user request can be a voice command. Thus, in one embodiment, the image-based reminder function can be a voice-activated app. For example, one could activate such an app by selecting voice activation and then speaking "please create an image-based reminder" or "remind me to perform [specified task] in [time period] at the present location." In response to the activation, the camera function can be put into a ready state to use for capturing the image (e.g., by having a camera app running on the screen of the mobile device).

In one embodiment, before the camera function is initiated, the mobile device can prompt the user for information (such as a time period and a message). This voice command can be provided before or after an image is taken or a location is detected. Regardless of how the user request is provided, the mobile device can prompt (e.g., audio or graphically) a user about what items are needed (which can be used in creating the message) according to various embodiments. In another embodiment, the information and the user request can be provided in one command. For example, the voice command can be "Please notify me to come to this place after 3 months for my oil change." The message can include these words exactly (e.g., "come to this place after 3 months for my oil change") or a modified version to account for grammatical changes.

II. Image-Based Reminder with Location

In some instances, the one or more images may not be sufficient to inform the user of a location for the reminder. For example, the user may not remember where the oil change service station is, and thus need to perform a search, thereby preventing some of the advantages of the image-based reminder. To address such instances, embodiments can detect a location of the mobile device, where the location is correlated to the captured image. The location can then be provided in an image-based reminder. Thus, the location can be easily accessible if the user does not remember the location from the image.

Figure 2:
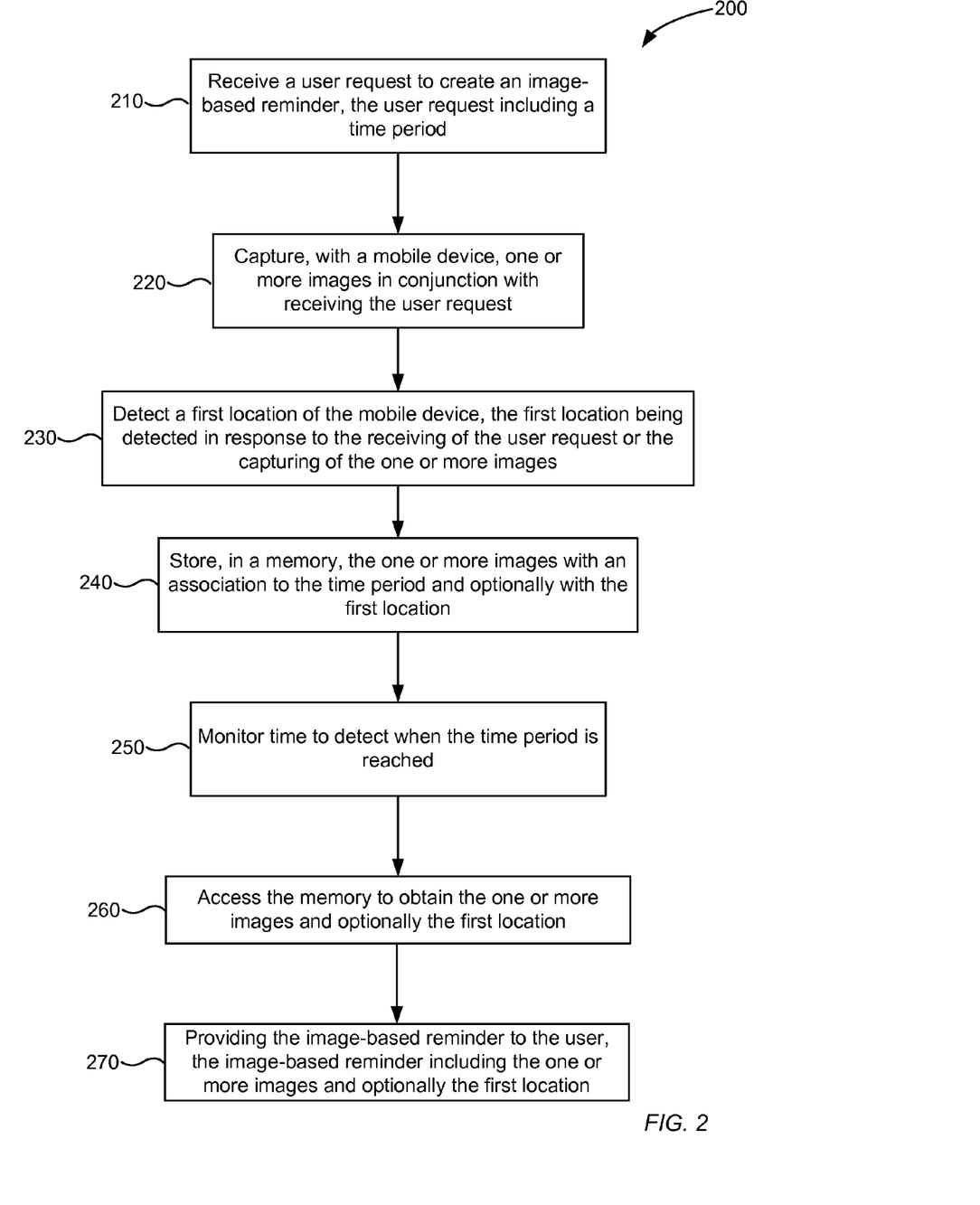
FIG. 2 is a flowchart illustrating a method 200 for providing an image-based reminder to a user according to embodiments of the present invention.

FIG. 2 is a flowchart illustrating a method 200 for providing an image-based reminder to a user according to embodiments of the present invention. In one embodiment, method 200 can optionally detect a location associated with a reminder and provide the location. In another embodiment, method 200 may just provide the one or more images and not detect a location associated with the reminder and provide the location.

At block 210, a mobile device receives a user request to create an image-based reminder. The user request includes a time period, which may be provided in any suitable manner, e.g., as described herein. The user request can be received in multiple stages, e.g., via various user interface and via various input screens. As detailed above, the user request can be received by selecting an image-based reminder app. The mere selection of the app can be used as a user request to create an image-based reminder. The user request can be received as any type of user input, e.g., by selection on a touch screen, using a pointer device, entering text, or via voice. The user request can include a message and other information, and may occur at various points in time relative to other blocks of method 200.

At block 220, the mobile device captures one or more images in conjunction with receiving the user request. The mobile device can include a camera having a lens and an image processor for capturing the one or more images and digitizing the images. The one or more images can be a photograph, series of photos, or be a video, which can also have associated audio.

The images can be captured in conjunction with the user request in various ways. In one embodiment, the user request causes a camera function to be initiated, e.g., before or after a screen for entering options, such as a time period and a message. In another embodiment, the user request is received after the images are taken. For example, a user input object (e.g., a button) can be displayed when the photo appears after the image is being taken. Further, the user request could be received at a later time when viewing the image, e.g., as part of an image library.

At block 230, the mobile device optionally detects a first location of the mobile device. The first location can be detected in response to the receiving of the user request or the capturing of the one or more images. Thus, the location can be the location of the mobile device when the one or more images are captured, and thus the location should effectively correspond with the location of the object in the image. As the user can provide the user request in conjunction with capturing the image, a location detected in response to the user request should also effectively correspond with the location of the object in the image. The location can be detected with various techniques, e.g., using GPS or via a network connection.

As mentioned, the location can be detected in response to the image being taken. For example, when the camera function is initiated as part of an image-based reminder, the mobile device can be configured to detect the current location of the mobile device when the image is taken. These two functions can be taken contemporaneously in that both function can operate at the same time or within close proximity in time, e.g., as part of a series of step in response to one action by the user. In another embodiment, the user request is received after the image is already taken, and the location can be detected at that time. For instance, in FIG. 1A, the user selection of user input object 120 can cause the location to be detected.

Some embodiments do not automatically detect location. As one example, the user can specify the location, e.g., by dropping a pin. Regardless of the mechanism for detecting location, the capturing of the image(s) can be first, followed by the user request or the location detection; or the user request can be received first followed by the capturing or the location detection.

At block 240, the one or more images are stored in a memory with an association to the time period and optionally with the first location. The memory can be on the mobile device or be a memory of a server, which is in communication with the mobile device. Regardless of where the memory resides, a storage controller of the mobile device can access the memory to retrieve the images and the first location.

In one embodiment, the image and the time period can be stored as an object, e.g., a database object. The object could have predetermined fields, e.g., a pointer to the image(s), a field for the time period, a character field for the message, and fields for any other information that is used as part of the image-based reminder. Thus, the images can be stored associated with a pointer or other reference that identifies the one or more images in memory. Further, a function for displaying the images can be identified in the object that comprises the image-based reminder. This data can be retrieved in response to the time period being reached.

At block 250, time is monitored to detect when the time period is reached. The time period can be set in various ways. For example, the time period can be set in a similar manner as an alarm. When an elapsed time is used, a timer could be initiated, e.g., a reverse time counting backwards to zero could cause the reminder to be sent when zero is reached. Periodic checks can be made to determine whether the timer or the date/time of an alarm has reached a predetermined value. The time may be monitored by the mobile device or by a server in communication with the mobile device.

At block 260 when the time period is reached, the memory is accessed to obtain the one or more images and optionally the first location. When the time period is reached, a signal can be sent to an image-based reminder app that can control the retrieval of images, location, and message, and subsequent actions. The signal can include an ID corresponding to the reminder object saved in the image-based reminder app. For example, the timer function can be tied to the image-based reminder app, which can access the reminder object to determine the location of the one or more images, as well as any other items of the reminder (e.g., the first location and the message). In one implementation, the end of the timer (or the current date/time being equal to the date/time set on the alarm) can call a function that accesses the reminder object, which contains or references the reminder items (i.e., the image(s), location, message, etc.). The routine can then retrieve the items in a prescribed order (which can vary depending on a default programming or a user input) for displaying.

At block 270, the image-based reminder is provided to the user. The image-based reminder includes the one or more images and optionally the first location. In various embodiments, the reminder items can be provided as a series (e.g., image(s), then location, then message) or displayed simultaneously. As another example, the location could be shown first, then the message, and then the image(s). The user can be provided with navigation tools to move between the different items. In another embodiment, some or all of data items could be provided in a single screen. For example, FIG. 1C shows the message and the image on the same screen. Thus, the user can get automatic notifications with useful details (e.g., image and potentially exact location) at the desired time.

Figure 3A:
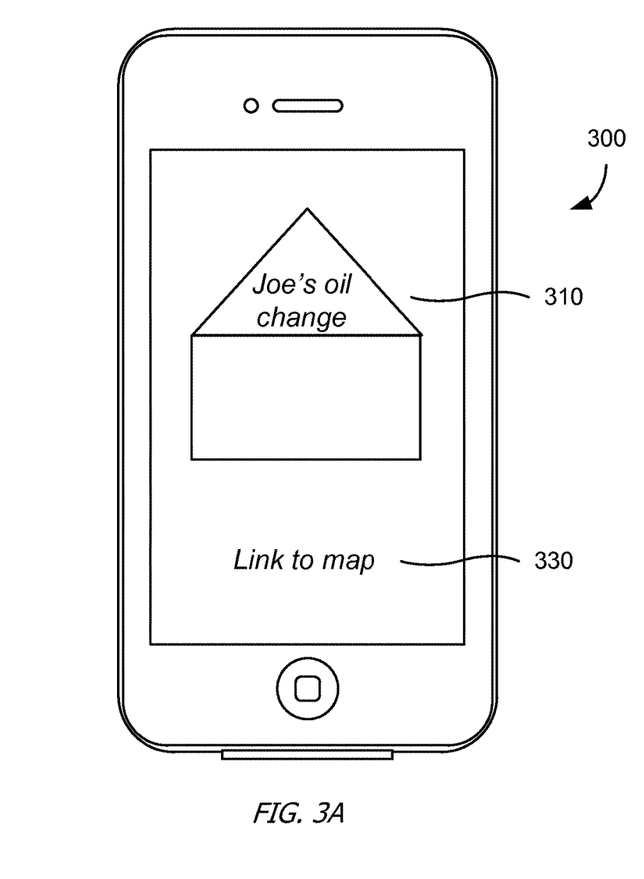
FIG. 3A shows an image-based reminder with a link to a map to show the first location according to embodiments of the present invention.

FIG. 3A shows an image-based reminder with a link to a map to show the first location according to embodiments of the present invention. Mobile device 300 shows image 310 with a link to a map 330. Image 310 can be provided to the user in response to the time period being reached. As with examples above, the image can convey a purpose of the reminder. A message could also be displayed on the same screen. Besides image 310, a link 330 to a map is provided, where link 330 can show the detected location on the map.

Figure 3B:
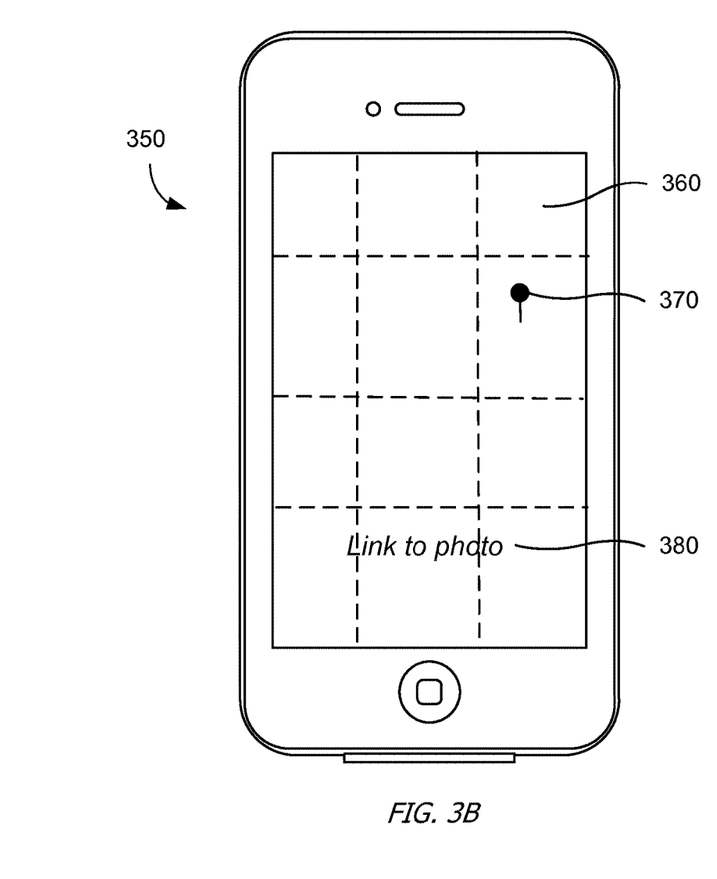
FIG. 3B shows a map with a link to the image according to embodiments of the present invention.

FIG. 3B shows a map with a link to the image according to embodiments of the present invention. Mobile device 350 shows map 360 indicating the first location 370 with a link 380 to the image(s). Besides showing the first location, map 360 can include directions from a current location of the user. In addition or instead of a map, directions to the location can be provided in text form. Link 380 could be tied to a pin designating the first location 370.

III. Feedback Based on Reminder

After receiving the image-based reminder, the user can provide feedback to the mobile device. For example, the user may choose to delay (snooze) the notification to a later time. This can effectively create a new image-based reminder from the old one, and a new time period would be used. Depending on the current location of the user, the user might want to go to a different branch for the store that is associated with the first location. The user could request different location for "Joe's Oil Change", and a map app can search for different locations and provide a location that is closer to the current location of the user. The map app could also generalize the location. For example, instead of a particular oil change company, the search can be broadened for any oil change company at the request of the user, as may occur if the first location is far from the current location.

In one embodiment, the mobile device can provide alternative locations automatically, which may be done instead of or in addition to sending information (e.g., a link) about the first location. For example, if the distance between the user and the first location is large, the first location may not be so convenient. Thus, alternative locations can be provided.

In one implementation, the mobile device (and/or a server in communication with the mobile device) detects a current location of the mobile device when the time period is reached. A distance between the first location and the current location is determined. The distance is compared to a threshold distance. When the distance exceeds the threshold distance, one or more other locations can be identified. These other locations can be ones that offer similar goods and/or services (or other characteristics) as the first location. A database can store locations as a directory with associated keywords. Thus, these other locations can be identified using keywords that are associated with the other locations and that are associated with the first location. For example, Joe's Oil Change can be associates with the keyword "Oil Change," where another oil change service station is also associated with the keyword "Oil Change". It can then be determined whether the one or more other locations are within the threshold distance of the current location. If they are, these other locations can be provided to the user, e.g., in a map.

IV. Extracting Data from Photo for Location-Based Reminder

Besides being used to display to the user, the captured images can be used to extract information. This extracted information can be used to formulate a message to the user, or otherwise provide information to the user. In this manner, the user does not have to provide information to an image-based reminder app.

Figure 4:
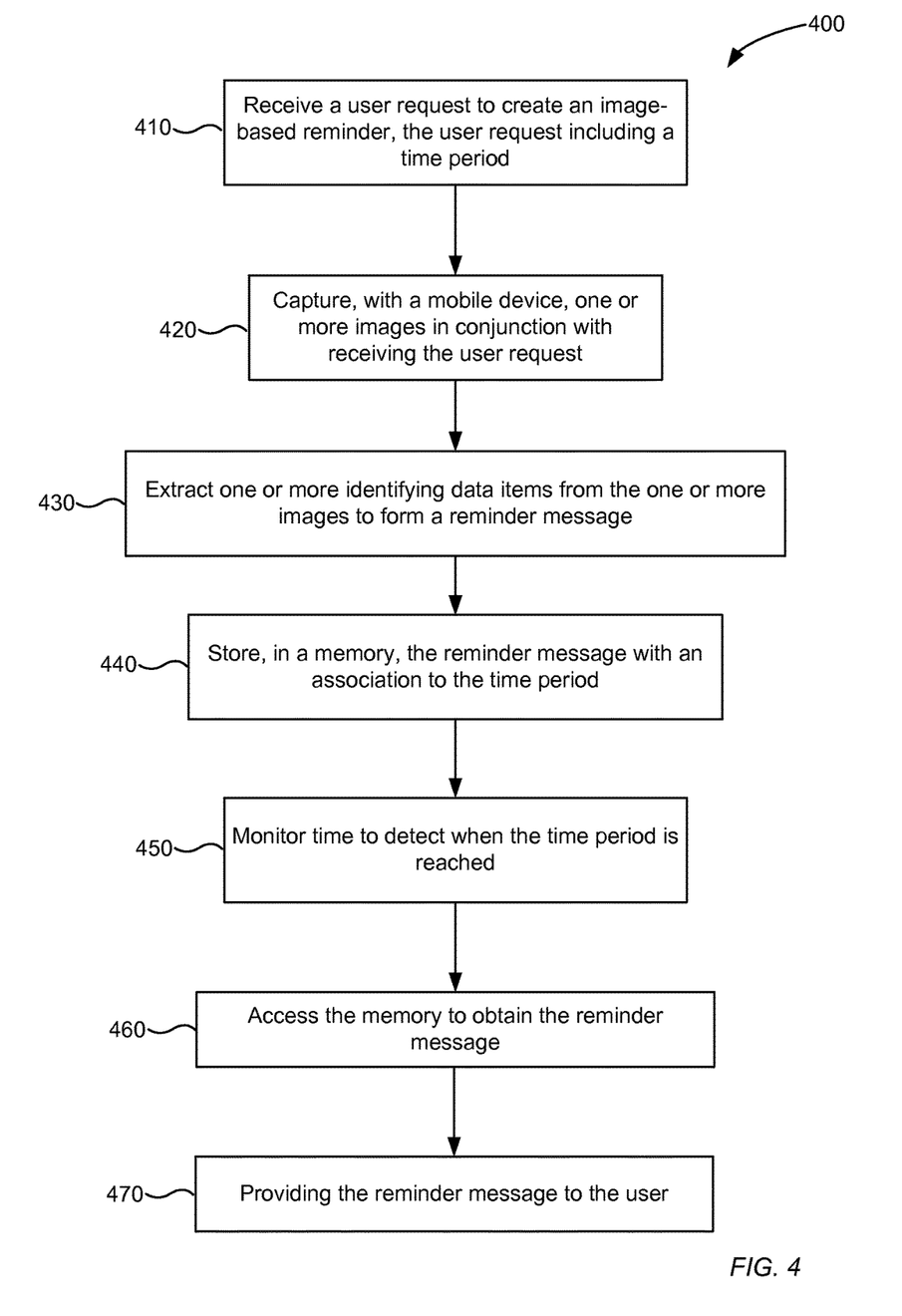
FIG. 4 is a flowchart illustrating a method 400 for determining a message for an image-based reminder according to embodiments of the present invention.

FIG. 4 is a flowchart illustrating a method 400 for determining a message for an image-based reminder according to embodiments of the present invention. Aspects of method 400 can be performed in a similar or same manner as method 200. Aspects of method 400 can also be used to supplement method 200. For example, the extraction of data items from an image can be used in method 200. But, this is just one example of how aspects of the methods 200 and 400 and their associated embodiments can be combined.

At block 410, a mobile device receives a user request to create an image-based reminder. The user request includes a time period, which may be provided in any suitable manner, e.g., as described herein. As with method 200, the user request can include a message and other information, and may occur at various points in time relative to other blocks of method 400.

At block 420, the mobile device captures one or more images in conjunction with receiving the user request. The images can be captured in a same manner as in block 220 of method 200. For example, the mobile device can include a camera having a lens and an image processor for capturing the one or more images and digitizing the images.

At block 430, one or more identifying data items are extracted from the one or more images to form a reminder message. The data items may be of various types, e.g., characters, a numerical value, and a value associated with the images (e.g., a location associated with the images). The images and related data can be analyzed to extract the data according to an algorithm that looks for particular types of data items.

Figure 5:
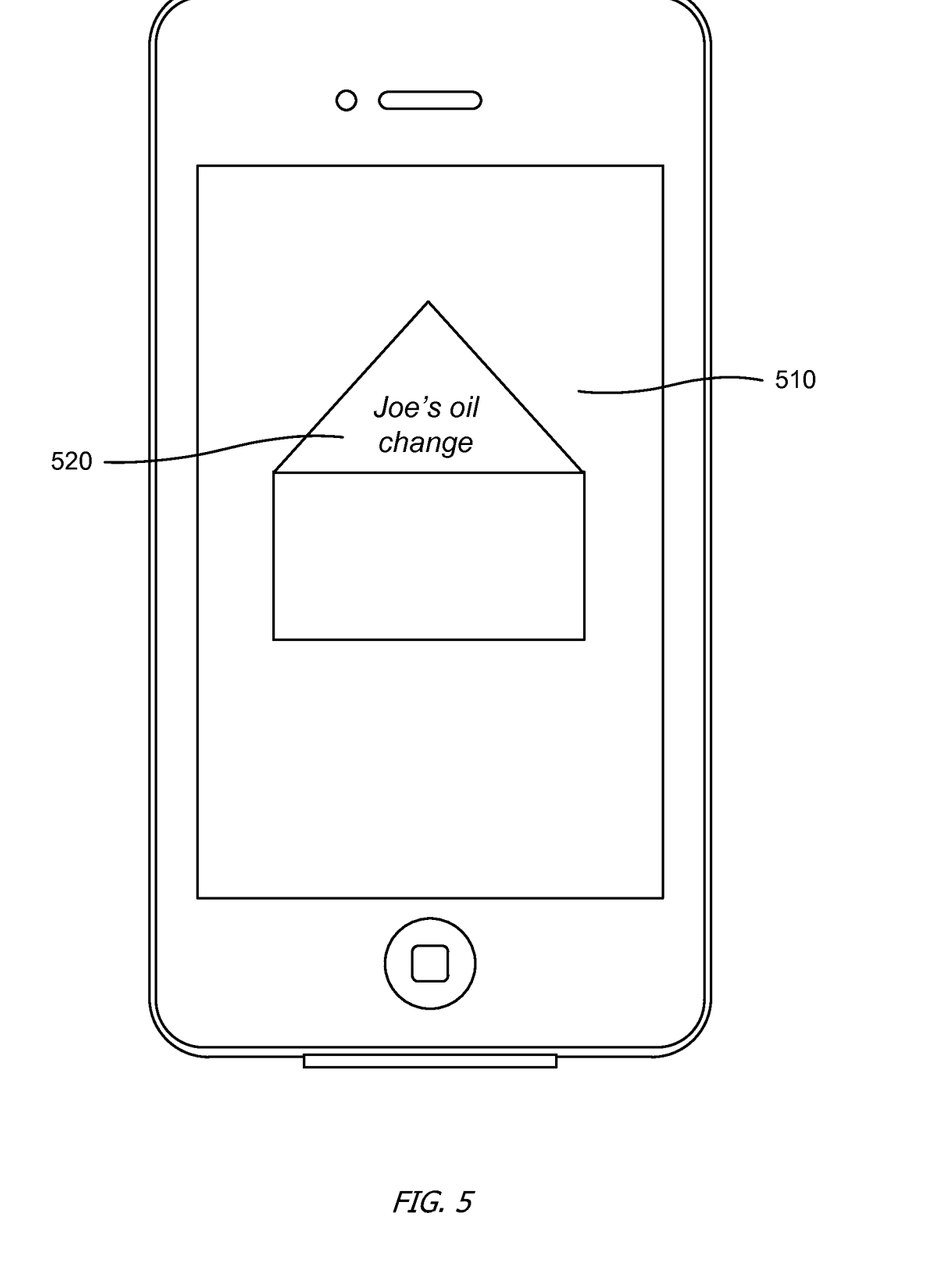
FIG. 5 shows an image with a data item of text to be extracted according to embodiments of the present invention.

In one embodiment, the data items may be text. For example, the pixels of the image can be analyzed to find text. For example, techniques for optical character recognition can be used to find contrasts in pixels to identify shapes, where the shapes are identified as corresponding to characters of language. Words can be identified from the characters. These words can be used to create the message or to cross-reference messages, as is described below. For example, FIG. 5 shows an image 510 with "Joe's Oil Change" as text 520 that can be extracted from image 510. The mobile phone (or a server to which the phone is in communication with) can analyze image 510 to identify any text. In this case, "Joe's Oil Change" would be identified. This text could then be used to create a reminder message. For instance, the text could be repeated as the reminder message. Other examples are described below.

In another embodiment, the extracted data is a location that is detected when the images are captured. The location can be detected as described herein. In one implementation, the location is detected in response to a signal to capture the one or more images, as may occur when a user take a picture or video. Thus, the location may be detected automatically. There may be a requirement of a user request to create the image-based reminder for the location to be detected automatically.

The location can be used to access a database to find keywords about the location, e.g., a name of a store, goods or services provided at the location, or other characteristic of the location. Such keywords can be used to create the message or identify a message to be provided. In one embodiment, after extracting the location, the mobile device could show the location on a map. The user request for forming the image-based reminder could then be prompted by the mobile device and the user may provide an affirmative answer to create the image-based reminder.

At block 440, the reminder message can be stored in a memory with an association to the time period. As with method 200, the memory can be on the mobile device or be a memory of a server, which is in communication with the mobile device. For example, a storage controller of the mobile device can communicate with a server to store the reminder message at the server.

At block 450, time is monitored to detect when the time period is reached. The time period can be set in various ways, as is described herein. In one embodiment, the time period can be sent to another device for monitoring, and the mobile device can monitor by waiting for a signal about the end of the time period being reached. Thus, the monitoring may be achieved by receiving a signal about the end of a time period from another device. In one embodiment, the extracted data items and/or the reminder message can be sent to another device, e.g., a car, which can provide the reminder message to the user. In such an example, the other device can monitor time and send the reminder message.

At block 460, when the time period is reached, the memory is accessed to obtain the reminder message. The reminder message can be stored as a data object of multiple items, e.g., as described above. As many reminder objects may be stored, an ID may be used to determine which reminder message is to be accessed for providing to the user.

At block 470, the reminder message is provided to the user. The reminder message can be provided visually or via audio. The image can also be displayed, but not necessarily. Other examples of providing the reminder message include providing a map with an extracted location. Thus, the reminder message does not necessarily include text, but a textual message may also be provided along with the location.

V. Forming a Message

As mentioned above, the extracted data items can include text. This text can form the only text of a reminder message. As another example, the text can be inserted as variable text into a phrase, such as "Reminder: <text>", where the extracted text can be inserted into the blank. Thus, the extraction of data items to form a reminder message can include identifying text in the one or more images and using the text to form the reminder message. Besides such example, the reminder can also be formed using the extracted data items to access a database to determine a message. For example, the extracted data items can be used as keywords for accessing a database object (also generically called a data table) that stores messages associated with keywords.

Figure 6A:
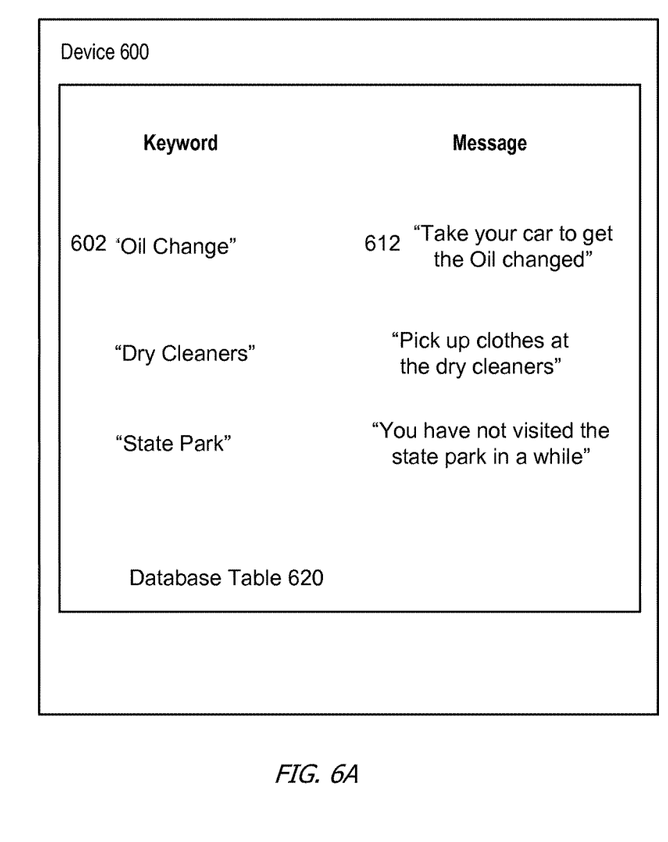
FIG. 6A shows a device 600 including a database table 620 that stores messages associated with keywords according to embodiments of the present invention.

FIG. 6A shows a device 600 including a database table 620 that stores messages associated with keywords according to embodiments of the present invention. As shown, each keyword is associated with a corresponding message such that table 620 can be cross-referenced with the keyword to find a corresponding message. The keyword can be obtained from text extracted from the image. For example, keyword 602 can be obtained from the extracted text "Joe's Oil Change". Keyword 602 "Oil Change" is associated with the message 612 of "Take your car to get the oil changed." In this manner, an appropriate and clearer message can be provided. The keyword can be a single word or a phrase.

Device 600 can be the mobile device or a server in communication with the mobile device. For example, the server can receive the keyword from the mobile device, and then access the database table 620 using the received keyword. The corresponding message can then be provided to the mobile device for providing to the user.

Other examples of keywords are also provided. The messages may be for a specific task that needs to be done, or just a reminder about an action (e.g., a visit) that the user would like to perform. In one embodiment, a user can specify the messages to be used for particular keywords. In this manner, the user can create his/her own database table. For example, the user can specify the messages by explicitly associating a keyword and entering text for the message. As another example, a pattern of messages entered for an image containing an extracted keyword, and the device can determine an association between the keyword and the message based on the pattern. For instance, after five (or other threshold value) messages have had the same textual message entered by a user for an image having a same keyword, the device could automatically identify the message, which can be provided as a suggestion for the user to confirm in setting the reminder message. In another embodiment, the messages can be formed from common messages that have been added by other users.

Accordingly, the extraction of data items to form a reminder message can include identifying text in the one or more images and cross-referencing the text with a table of keywords. The table can be any object that has keywords stored with associated messages. When the text matches a keyword in the table, the message corresponding that keyword can be determined. The corresponding message can then be used to form the reminder message.

Figure 6B:
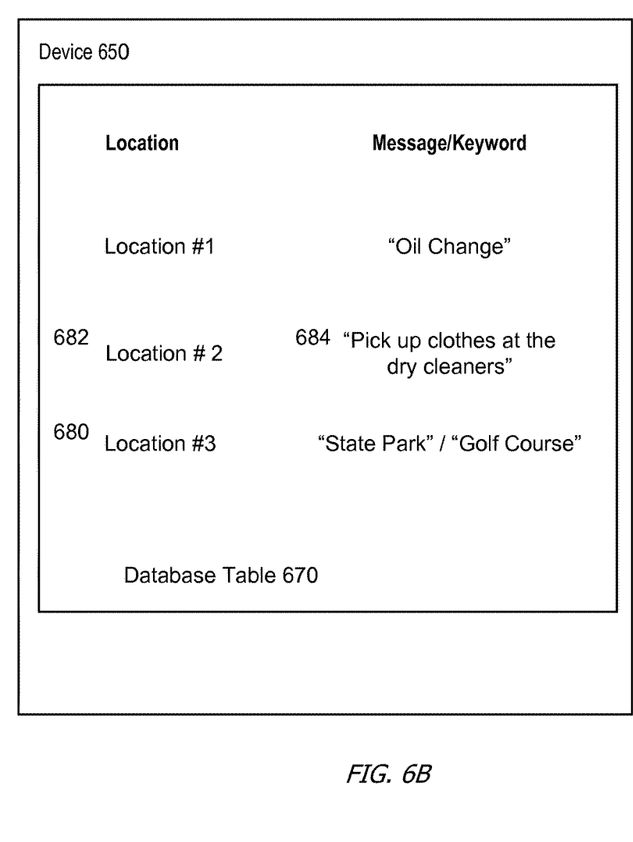
FIG. 6B shows a device 650 including a database table 670 that stores locations associated with keywords and/or messages according to embodiments of the present invention.

If the keyword is stored associated with a message, then device 600 can automatically access table 620 to obtain the message. But, if no matching keyword is found in database table 620, then no message may be identified. As a default, the image can be displayed when no corresponding message is found. In another implementation, the keyword can be extracted from another table, e.g., as shown in FIG. 6B. For example, a detected location can be used to determine the keyword.

FIG. 6B shows a device 650 including a database table 670 that stores locations associated with keywords and/or messages according to embodiments of the present invention. As shown, each location is associated with a corresponding message or keyword, such that table 670 can be cross-referenced with the location to find a corresponding item (message or keyword). An entry in table 670 can be associated with more than one item, or there can be multiple entries corresponding to a location. The locations can be distinguished or identified in various ways, e.g., using coordinates of a grid (such as latitude and longitude) or a unique identifier, which may correspond to a particular set of coordinates. Whether or not an item is a message or a keyword can be marked with a flag. Thus, each item can have information associated with it. In another embodiment, two separate tables can be used, where one table has locations associated with keywords and the other table has locations associated with messages.

Thus, the location can be extracted from an image, where the location can be defined by coordinates or other identifier. The identifier can be used to cross-reference table 670 to identify a message corresponding with the location. For example, location 682 can be found in table 670 and the corresponding message 684 can be used as the reminder message. As with other reminder messages, other text can be added.

In an embodiment where the location is associated with a keyword, the location can be extracted as an identifying data item. The location can be used to cross-reference a database (e.g., table 670) to identify a first keyword associated with the first location. The first keyword can then be used to identify a corresponding message (e.g., by accessing table 620). The corresponding message can then be used to form the reminder message.

In some situations, a location could be associated with two or more messages or keywords (or a keyword associated with two or more messages). For example, location 680 shows two different keywords. In such an instance, an algorithm may be used to determine which keyword to use or use first to attempt to find a corresponding message (e.g., as a keyword may not have a message associated with it). In one embodiment, the user is presented with a first message associated with a first keyword, and the user can choose to accept the first message, where the first keyword is chosen at random. If the user does not choose the first message, then other messages can be provided. As an alternative, the messages can be ranked across users or remembered for the next time, and the highest ranking message can be provided initially to the user to select or simply be used. Such an algorithm can also be used when a location matches two entries, which may be in different tables. The separate entries could also have a mix of keywords and messages. As mentioned above, the user can enter messages or keywords to create personalized tables.

VI. Mobile Device and Server

Figure 7A:
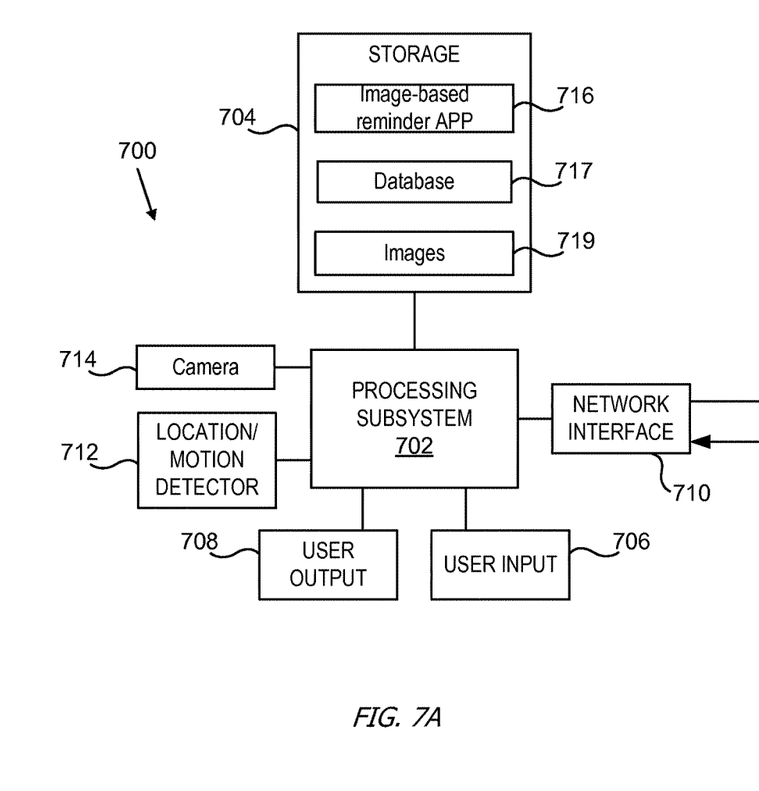
FIG. 7A is a simplified block diagram of an implementation of a device 700 according to an embodiment of the present invention.

FIG. 7A is a simplified block diagram of an implementation of a mobile device 700 according to an embodiment of the present invention. Device 700 can be a handheld device, a notebook computer or any suitable electronic device with a screen for displaying images and that is capable of communicating with a server 750 as described herein. Device 700 includes a processing subsystem 702, a storage subsystem 704, a user input device 706, a user output device 708, a network interface 710, and a location/motion detector 712.

Processing subsystem 702, which can be implemented as one or more integrated circuits (e.g., e.g., one or more single-core or multi-core microprocessors or microcontrollers), can control the operation of device 700. In various embodiments, processing subsystem 702 can execute a variety of programs in response to program code and can maintain multiple concurrently executing programs or processes. At any given time, some or all of the program code to be executed can be resident in processing subsystem 702 and/or in storage subsystem 704.

Through suitable programming, processing subsystem 702 can provide various functionality for device 700. For example, processing subsystem 702 can execute an image-based reminder application program (or "app") 716. App 716 can perform all or parts of methods described herein, such as obtaining one or more images, a location, accessing database, etc. App 716 can use location information from location/motion detector 712, e.g., as described herein.

Storage subsystem 704 can be implemented, e.g., using disk, flash memory, or any other storage media in any combination, and can include volatile and/or non-volatile storage as desired. In some embodiments, storage subsystem 704 can store one or more application programs to be executed by processing subsystem 702 (e.g., app 716). In some embodiments, storage subsystem 704 can store other data (e.g., used by and/or defined by app 716). For example, database 717 can store records with associated keywords, locations, and messages. Programs and/or data can be stored in non-volatile storage and copied in whole or in part to volatile working memory during program execution.

A user interface can be provided by one or more user input devices 706 and one or more user output devices 708. User input devices 706 can include a touch pad, touch screen, scroll wheel, click wheel, dial, button, switch, keypad, microphone, or the like. User output devices 708 can include a video screen, indicator lights, speakers, headphone jacks, or the like, together with supporting electronics (e.g., digital-to-analog or analog-to-digital converters, signal processors, or the like). A customer can operate input devices 706 to invoke the functionality of device 700 and can view and/or hear output from device 700 via output devices 708.

Network interface 710 can provide voice and/or data communication capability for device 700. For example, network interface 710 can provide device 700 with the capability of communicating with server 750. In some embodiments network interface 710 can include radio frequency (RF) transceiver components for accessing wireless voice and/or data networks (e.g., using cellular telephone technology, advanced data network technology such as 3G, 4G or EDGE, WiFi (IEEE 802.11 family standards, or other mobile communication technologies, or any combination thereof), and/or other components. In some embodiments network interface 710 can provide wired network connectivity (e.g., Ethernet) in addition to or instead of a wireless interface. Network interface 710 can be implemented using a combination of hardware (e.g., antennas, modulators/demodulators, encoders/decoders, and other analog and/or digital signal processing circuits) and software components.

Location/motion detector 712 can detect a past, current or future location of device 700 and/or a past, current or future motion of device 700. For example, location/motion detector 712 can detect a velocity or acceleration of mobile electronic device 700. Location/motion detector 712 can comprise a Global Positioning Satellite (GPS) receiver and/or an accelerometer. In some instances, processing subsystem 702 determines a motion characteristic of device 700 (e.g., velocity) based on data collected by location/motion detector 712. For example, a velocity can be estimated by determining a distance between two detected locations and dividing the distance by a time difference between the detections.

A camera 714 can be used to capture the images. Camera 714 can include a lens and an image processor, which can be part of processing subsystem 702. A detected location can be stored with an association to the time period and the one or more images. The images can be stored in an images part 719 of storage 704.

Figure 7B:
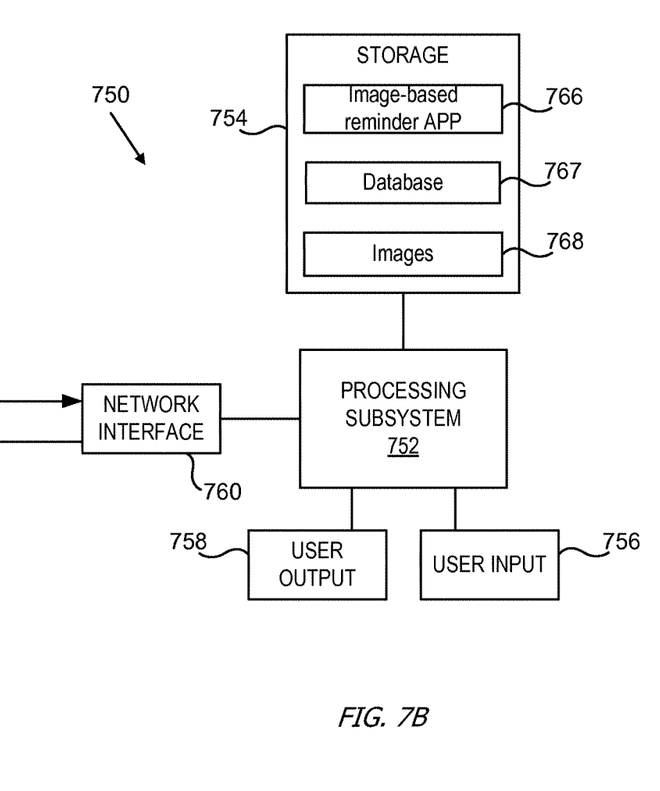
FIG. 7B is a simplified block diagram of an implementation of map server 750 according to an embodiment of the present invention.

FIG. 7B is a simplified block diagram of an implementation of a server 750 according to an embodiment of the present invention. Server 750 may simply receive and forward a conditional communication, determine which device to forward a conditional communication, and/or analyze the conditional communication to determine how and when it is satisfied. Server 750 includes a processing subsystem 752, storage subsystem 754, a user input device 756, a user output device 758, and a network interface 760. Network interface 760 can have similar or identical features as network interface 710 of device 700 described above.

Processing subsystem 752, which can be implemented as one or more integrated circuits (e.g., a conventional microprocessor or microcontroller), can control the operation of server 750. In various embodiments, processing subsystem 752 can execute a variety of programs in response to program code and can maintain multiple concurrently executing programs or processes. At any given time, some or all of the program code to be executed can be resident in processing subsystem 752 and/or in storage subsystem 754.

Through suitable programming, processing subsystem 752 can provide various functionality for server 750. Thus, server 750 can interact with an image-based reminder app 716 (e.g., via image-based reminder app 766) being executed on device 700 in order to provide information from database 767, indications of an elapsed time reaching a threshold, a message indicating a reminder, and other information mentioned herein. Server 750 can also perform same or similar functionality as device 700.

Storage subsystem 754 can be implemented, e.g., using disk, flash memory, or any other storage media in any combination, and can include volatile and/or non-volatile storage as desired. In some embodiments, storage subsystem 754 can store one or more application programs (e.g., image-based reminder app 766) to be executed by processing subsystem 752. In some embodiments, storage subsystem 754 can store other data, such as images 768 and location records in database 767. Programs and/or data can be stored in non-volatile storage and copied in whole or in part to volatile working memory during program execution.

A user interface can be provided by one or more user input devices 756 and one or more user output devices 758. User input and output devices 756 and 758 can be similar or identical to user input and output devices 706 and 708 of device 700 described above. In some instances, user input and output devices 756 and 758 are configured to allow a programmer to interact with server 750. In some instances, server 750 can be implemented at a server farm, and the user interface need not be local to the servers.

The user interface of device 700 can be configured to receive a user request to create an image-based reminder. A time period for the user request can be stored in storage 704 at a server (e.g., server 750). Storage 704 and/or processing subsystem 702 can comprise a storage controller configured to store, in a memory (e.g., storage 704 or storage 754 of server 750), the one or more images with an association to the time period. In one embodiment, the storage controller is configured to store the one or more images associated with the time period in a memory (e.g., storage 754) on a server in communication with the mobile device. Processing subsystem 702 and/or processing subsystem 752 can be configured to monitor time to detect when the time period is reached; and when the time period is reached, access the memory to obtain the one or more images for providing to the user.

Either or both storage 704 and storage 754 can include a database table that stores keywords associated with messages. The processing subsystems 702 and/or 752 can perform methods described herein using the database table. Databases 717 and 767 may include multiple tables, e.g., as are described herein.

It will be appreciated that device 700 and server 750 described herein are illustrative and that variations and modifications are possible. A device can be implemented as a mobile electronic device and can have other capabilities not specifically described herein (e.g., telephonic capabilities, power management, accessory connectivity, etc.). In a system with multiple devices 700 and/or multiple servers 750, different devices 700 and/or servers 750 can have different sets of capabilities; the various devices 700 and/or servers 750 can be but need not be similar or identical to each other.

Further, while device 700 and server 750 are described with reference to particular blocks, it is to be understood that these blocks are defined for convenience of description and are not intended to imply a particular physical arrangement of component parts. Further, the blocks need not correspond to physically distinct components. Blocks can be configured to perform various operations, e.g., by programming a processor or providing appropriate control circuitry, and various blocks might or might not be reconfigurable depending on how the initial configuration is obtained. Embodiments of the present invention can be realized in a variety of apparatus including electronic devices implemented using any combination of circuitry and software.

Additionally, while device 700 and server 750 are described as singular entities, it is to be understood that each can include multiple coupled entities. For example, server 750 can include, a server, a set of coupled servers, a computer and/or a set of coupled computers.

It should be understood that any of the embodiments of the present invention can be implemented in the form of control logic using hardware (e.g. an application specific integrated circuit or field programmable gate array) and/or using computer software with a generally programmable processor in a modular or integrated manner. As user herein, a processor includes a multi-core processor on a same integrated chip, or multiple processing units on a single circuit board or networked. Based on the disclosure and teachings provided herein, a person of ordinary skill in the art will know and appreciate other ways and/or methods to implement embodiments of the present invention using hardware and a combination of hardware and software.

Any of the software components or functions described in this application may be implemented as software code to be executed by a processor using any suitable computer language such as, for example, Java, C++ or Perl using, for example, conventional or object-oriented techniques. The software code may be stored as a series of instructions or commands on a computer readable medium for storage and/or transmission, suitable media include random access memory (RAM), a read only memory (ROM), a magnetic medium such as a hard-drive or a floppy disk, or an optical medium such as a compact disk (CD) or DVD (digital versatile disk), flash memory, and the like. The computer readable medium may be any combination of such storage or transmission devices.

Such programs may also be encoded and transmitted using carrier signals adapted for transmission via wired, optical, and/or wireless networks conforming to a variety of protocols, including the Internet. As such, a computer readable medium according to an embodiment of the present invention may be created using a data signal encoded with such programs. Computer readable media encoded with the program code may be packaged with a compatible device or provided separately from other devices (e.g., via Internet download). Any such computer readable medium may reside on or within a single computer product (e.g. a hard drive, a CD, or an entire computer system), and may be present on or within different computer products within a system or network. A computer system may include a monitor, printer, or other suitable display for providing any of the results mentioned herein to a user.

Any of the methods described herein may be totally or partially performed with a computer system including one or more processors, which can be configured to perform the steps. Thus, embodiments can be directed to computer systems configured to perform the steps of any of the methods described herein, potentially with different components performing a respective steps or a respective group of steps. Although presented as numbered steps, steps of methods herein can be performed at a same time or in a different order. Additionally, portions of these steps may be used with portions of other steps from other methods. Also, all or portions of a step may be optional. Additionally, any of the steps of any of the methods can be performed with modules, circuits, or other means for performing these steps.

The specific details of particular embodiments may be combined in any suitable manner without departing from the spirit and scope of embodiments of the invention. However, other embodiments of the invention may be directed to specific embodiments relating to each individual aspect, or specific combinations of these individual aspects.

The above description of exemplary embodiments of the invention has been presented for the purposes of illustration and description. It is not intended to be exhaustive or to limit the invention to the precise form described, and many modifications and variations are possible in light of the teaching above. The embodiments were chosen and described in order to best explain the principles of the invention and its practical applications to thereby enable others skilled in the art to best utilize the invention in various embodiments and with various modifications as are suited to the particular use contemplated.

A recitation of "a", "an" or "the" is intended to mean "one or more" unless specifically indicated to the contrary.

What is claimed is:

1. A method of providing a reminder to a user, the method comprising:
   receiving, at a mobile device, a user request to create an image-based reminder, the user request including a time period;
   capturing, with the mobile device, one or more images in conjunction with receiving the user request, the mobile device including a camera for capturing the one or more images;
   detecting, with the mobile device, a first location of the mobile device in conjunction with receiving the user request;
   storing, in a memory, the one or more images and the first location with an association to the time period;
   monitoring time to detect when the time period is reached; and
   when the time period is reached:
      accessing the memory to obtain the one or more images and the first location;
      detecting, with the mobile device, a current location of the mobile device;
      determining a distance between the first location and the current location;
      comparing the distance to a threshold distance;
      in accordance with a determination that the distance does not exceed the threshold distance:
         providing the image-based reminder to the user, the image-based reminder including the one or more images and the first location; and
      in accordance with a determination that the distance exceeds the threshold distance:
         identifying one or more other locations that are associated with one or more keywords that match one or more keywords associated with the first location; and
         in accordance with a determination that the one or more other locations are within the threshold distance of the current location, providing the one or more other locations to the user.

2. The method of claim 1, wherein the first location is detected in response to the receiving of the user request or the capturing of the one or more images.

3. The method of claim 1, wherein providing the image-based reminder to the user includes:
   displaying the one or more images with a link to a map indicating the first location, or
   displaying a map indicating the first location with a link to the one or more images.

4. The method of claim 1, wherein the user request is received after the one or more images are captured, the method further comprising:
   displaying a user input object for the user to indicate whether the one or more images are to be used for an image-based reminder, wherein receiving the user request includes:
      receiving the user request via the user input object.

5. The method of claim 1, wherein the user request includes a message for providing with the image-based reminder.

6. The method of claim 1, wherein the memory is at a server or on the mobile device.

7. The method of claim 1, wherein the time period includes:
   a date and time, or
   an elapsed time from a start time of receiving the user request.

8. The method of claim 1, wherein capturing the one or more images is performed in response to receiving the user request.

9. A mobile device comprising:
a user interface configured to receive a user request to create an image-based reminder, the user request including a time period;
a camera for capturing one or more images in conjunction with receiving the user request;
a location detector configured to determine a first location of the mobile device in conjunction with receiving the user request;
a storage controller configured to store, in a memory, the one or more images and the first location with an association to the time period;
a processing subsystem configured to:
monitor time to detect when the time period is reached; and
when the time period is reached:
access the memory to obtain the one or more images and the first location;
determine a distance between the first location and a current location of the mobile device determined using the location detector;
compare the distance to a threshold distance;
in accordance with a determination that the distance does not exceed the threshold distance:
provide the image-based reminder to the user, the image-based reminder including the one or more images and the first location; and
in accordance with a determination that the distance exceeds the threshold distance:
identify one or more other locations that are associated with one or more keywords that match one or more keywords associated with the first location; and
in accordance with a determination that the one or more other locations are within the threshold distance of the current location, providing the one or more other locations to the user.

10. The mobile device of claim 9, wherein:
the location detector is configured to determine the first location of the mobile device in response to the receiving of the user request or the capturing of the one or more images.

11. The mobile device of claim 9, wherein the storage controller is configured to store the one or more images associated with the time period in a memory on a server in communication with the mobile device.

12. A method of providing a reminder to a user, the method comprising:
receiving, at a mobile device, a user request to create an image-based reminder, the user request including a time period;
capturing, with the mobile device, one or more images in conjunction with receiving the user request, the mobile device including a camera for capturing the one or more images;
extracting one or more identifying data items from the one or more images, wherein the one or more identifying data items include location information;
cross-referencing the location information with a database that stores one or more locations each associated with at least one of a corresponding keyword or a corresponding message, to identify a first message stored in the database and associated with the location information;
using the first message to form a reminder message;
storing, in a memory, the reminder message with an association to the time period;
monitoring time to detect when the time period is reached; and
when the time period is reached:
accessing the memory to obtain the reminder message; and
providing the reminder message to the user.

13. The method of claim 12, wherein extracting one or more identifying data items from the one or more images includes:
identifying text in the one or more images; and
the method further comprises using the text to form the reminder message.

14. The method of claim 12, wherein extracting one or more identifying data items from the one or more images includes:
identifying text in the one or more images;
the method further comprising:
cross-referencing the text with the database, the database including one or more keywords associated with messages in the database;
identifying a first keyword in the database that matches the text;
determining a second message that is associated with the first keyword; and
using the second message to form the reminder message.

15. The method of claim 12, wherein
cross-referencing the location information with the database to identify the first message associated with the location information includes:
cross-referencing the location information with the database to identify a first keyword associated with the location information; and
identifying the first message using the first keyword, wherein the first message is associated with the first keyword.

16. A mobile device comprising:
a user interface configured to receive a user request to create an image-based reminder, the user request including a time period;
a camera for capturing one or more images in conjunction with receiving the user request; and
a processing subsystem configured to:
extract one or more identifying data items from the one or more images, wherein the one or more identifying data items include location information;
cross-reference the location information with a database that stores one or more locations each associated with at least one of a corresponding keyword or a corresponding message, to identify a first message stored in the database and associated with the location information;
use the first message to form a reminder message;
store, in a memory, the reminder message with an association to the time period;
monitor time to detect when the time period is reached; and
when the time period is reached:
access the memory to obtain the reminder message; and
provide the reminder message to the user.

17. The mobile device of claim 16, wherein the processing subsystem is further configured to:
identify text in the one or more images;
cross-reference the text with the database;
identify a first keyword in the database that matches the text;

determine a second message using the first keyword, wherein the second message is associated with the first keyword; and use the second message to form the reminder message.

18. The mobile device of claim 16, wherein the processing subsystem is further configured to:

cross-reference the location information with the database to identify a first keyword associated with the location information;

identify the first message using the first keyword, wherein the first message is associated with the first keyword.

19. The method of claim 1, further comprising:

prior to creating the image-based reminder, cross-referencing the first location with a database to identify a first keyword associated with the first location;

wherein the image-based reminder provided to the user further includes the first keyword.

20. The method of claim 1, wherein identifying the one or more other locations that are associated with the one or more keywords that match the one or more keywords associated with the first location comprises:

cross-referencing the first location with a database to identify the one or more keywords associated with the first location; and cross-referencing at least one of the one or more keywords associated with the first location with the database to identify the one or more other locations associated with the one or more matching keywords.

* * * * *